US008527875B2

(12) United States Patent  
Ookuma

(10) Patent No.: US 8,527,875 B2  
(45) Date of Patent: Sep. 3, 2013

(54) INFORMATION PROCESSING APPARATUS AND METHOD OF CONTROLLING THE SAME

(75) Inventor: Satoshi Ookuma, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 377 days.

(21) Appl. No.: 12/911,527

(22) Filed: Oct. 25, 2010

(65) Prior Publication Data

US 2011/0137981 A1   Jun. 9, 2011

(30) Foreign Application Priority Data

Dec. 9, 2009   (JP) .................................. 2009-279816

(51) Int. Cl.  
*G06F 3/00* (2006.01)

(52) U.S. Cl.  
USPC ........... 715/703; 715/264; 715/714; 715/716; 709/203; 709/217; 709/220; 709/228; 704/8; 707/760

(58) Field of Classification Search  
USPC ......... 715/264, 265, 703, 714, 716; 709/203, 709/217, 220, 228; 704/8; 707/760  
See application file for complete search history.

(56) References Cited

U.S. PATENT DOCUMENTS

| 7,444,278 | B2 | 10/2008 | Bennett | |
|---|---|---|---|---|
| 8,184,941 | B2 * | 5/2012 | Takamori | 386/216 |
| 2004/0246505 | A1* | 12/2004 | Oh | 358/1.1 |
| 2007/0229512 | A1* | 10/2007 | Tsukamoto | 345/467 |
| 2008/0294796 | A1* | 11/2008 | Lee et al. | 709/245 |
| 2009/0201539 | A1* | 8/2009 | Sawayanagi et al. | 358/1.15 |
| 2011/0088058 | A1* | 4/2011 | Velazquez et al. | 725/33 |
| 2011/0125836 | A1* | 5/2011 | McCarthy | 709/203 |

FOREIGN PATENT DOCUMENTS

| JP | 2002-86847 | 3/2002 |
|---|---|---|
| JP | 2002-187327 | 7/2002 |
| JP | 2002-251261 | 9/2002 |
| JP | 2002-259071 | 9/2002 |
| JP | 2003-76502 | 3/2003 |
| JP | 2004-227199 | 8/2004 |
| JP | 2005-267649 | 9/2005 |

OTHER PUBLICATIONS

Japanese Office Action dated Jun. 14, 2013, issued during prosecution of related Japanese application No. 2009-279816.

* cited by examiner

*Primary Examiner* — Michael Won  
(74) *Attorney, Agent, or Firm* — Fitzpatrick, Cella, Harper & Scinto

(57) ABSTRACT

The information processing apparatus includes a screen display unit configured to display a first screen that displays content acquired from an external server and a second screen that displays content stored in the information processing apparatus, an accepting unit configured to accept language information about selection of a language to be used to display the first screen, a notification unit configured to notify a predetermined external server of the accepted language information and address information representing an address of the content, a first determination unit configured to determine whether the predetermined external server is a specific external server, and a setting unit configured to, when the first determination unit determines that the predetermined external server is the specific external server, set a language to be used to display the second screen to the same language as that of a received content.

7 Claims, 14 Drawing Sheets

INFORMATION PROCESSING APPARATUS AND METHOD OF CONTROLLING THE SAME

BACKGROUND OF THE INVENTION

1. Field of the Invention

The present invention relates to a technique of acquiring content from a web server and displaying it on an operation display unit.

2. Description of the Related Art

An information processing apparatus such as a PC is known to acquire, from a web server connected to a network, a document file or image data called content described in a structured language such as HTML (HyperText Markup Language) and causes a web browser installed in the information processing apparatus to display it on a display unit. Such an information processing apparatus displays the content acquired from the web server as an operation instruction screen on the web browser. The apparatus can also send a user's operation input instruction on the operation screen to the web server. That is, using the web browser enables use of the operation unit of the information processing apparatus as an operation instruction input/output unit for the web server.

An example of the information processing apparatus that realizes such web server operation instruction input/output using a web browser is a Multi Functional Peripheral (to be referred to as an "MFP" hereinafter) having a scanner and a printer. The web server performs image processing based on an operation instruction input from the web browser of the MFP, and then instructs the MFP to execute a scan operation or pointing via the network. This makes it possible to realize image processing and user management functions that are difficult to realize in the standalone MFP. To use a function of the MFP itself without needing a control instruction on the web server side, switching may be done between the content screen displayed by the web browser and the operation screen of the MFP itself.

The MFP also includes a unit configured to switch the display language currently used on the operation display unit. This unit can switch the display language on the operation screen of the MFP and that on various function setting screens of the web browser and the like.

However, the content displayed within the web browser is web content provided by the web server. For this reason, even when the display language of the MFP is switched, the display language and details of the content do not change.

In Japanese Patent Laid-Open No. 2004-227199, an MFP sends information of its display language to a web server together with a content acquisition request so as to cause the server to switch, based on the language information, the display language of the content to be returned to the MFP. This allows for synchronization of the primary display language of the operation screen of the MFP with the display language of the content. To switch the display language, however, the user first switches the display language of the MFP device, and then requests content in that display language from the web server. In this case, the trigger to instruct display language switching exists on the device side. Hence, even when the web server switches the display language of the content in accordance with the details of the content displayed on the web browser, the language of the operation screen of any function of the device main body does not change. Even when the web server switches the display language of the content, the display language of the functions of the device main body does not change. To synchronize the display language, the user needs to switch the display language of the device for himself/herself.

That is, the conventional method requires cumbersome display language switching, resulting in poor operability. In an information processing system in which a web server issues an operation instruction of an information processing apparatus such as an MFP, since the web server cannot switch the display language at its convenience, limitations are imposed on system construction and content creation.

SUMMARY OF THE INVENTION

The present invention therefore provides a technique of synchronizing the display language of content acquired from a web server with that of the content stored in an information processing apparatus itself.

According to one aspect of the present invention, an information processing apparatus comprises: a screen display unit configured to display a first screen that displays content acquired from an external server and a second screen that displays content stored in the information processing apparatus; an accepting unit configured to accept, from a user via the first screen, language information about selection of a language to be used to display the first screen; a notification unit configured to notify a predetermined external server of the accepted language information and address information representing an address of the content to be used to display the first screen; a first determination unit configured to determine whether the predetermined external server is a specific external server; and a setting unit configured to, when the first determination unit determines that the predetermined external server is the specific external server, set a language to be used to display the second screen to the same language as that of a received content in accordance with reception of the content from the specific external server.

According to another aspect of the present invention, a method of controlling an information processing apparatus including a display unit configured to display a first screen that displays content acquired from an external server and a second screen that displays content stored in the information processing apparatus, the method comprises: accepting, from a user via the first screen, language information about selection of a language to be used to display the first screen; notifying a predetermined external server of the accepted language information and address information representing an address of the content to be used to display the first screen; determining whether the predetermined external server is a specific external server; and when it is determined in the determining that the predetermined external server is the specific external server, setting a language to be used to display the second screen to the same language as that of a received content in accordance with reception of the content from the specific external server.

The present invention allows to provide a technique of synchronizing the display language of a content acquired from a WEB server with that of the content stored in an information processing apparatus itself.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

The best mode for carrying out the present invention will now be described with reference to the accompanying drawings.

Note that the embodiments to be described below do not limit the scope of claims of the present invention. Not all combinations of features described in the embodiments are always essential to the solving means of the present invention.

First Embodiment

Figure 1:
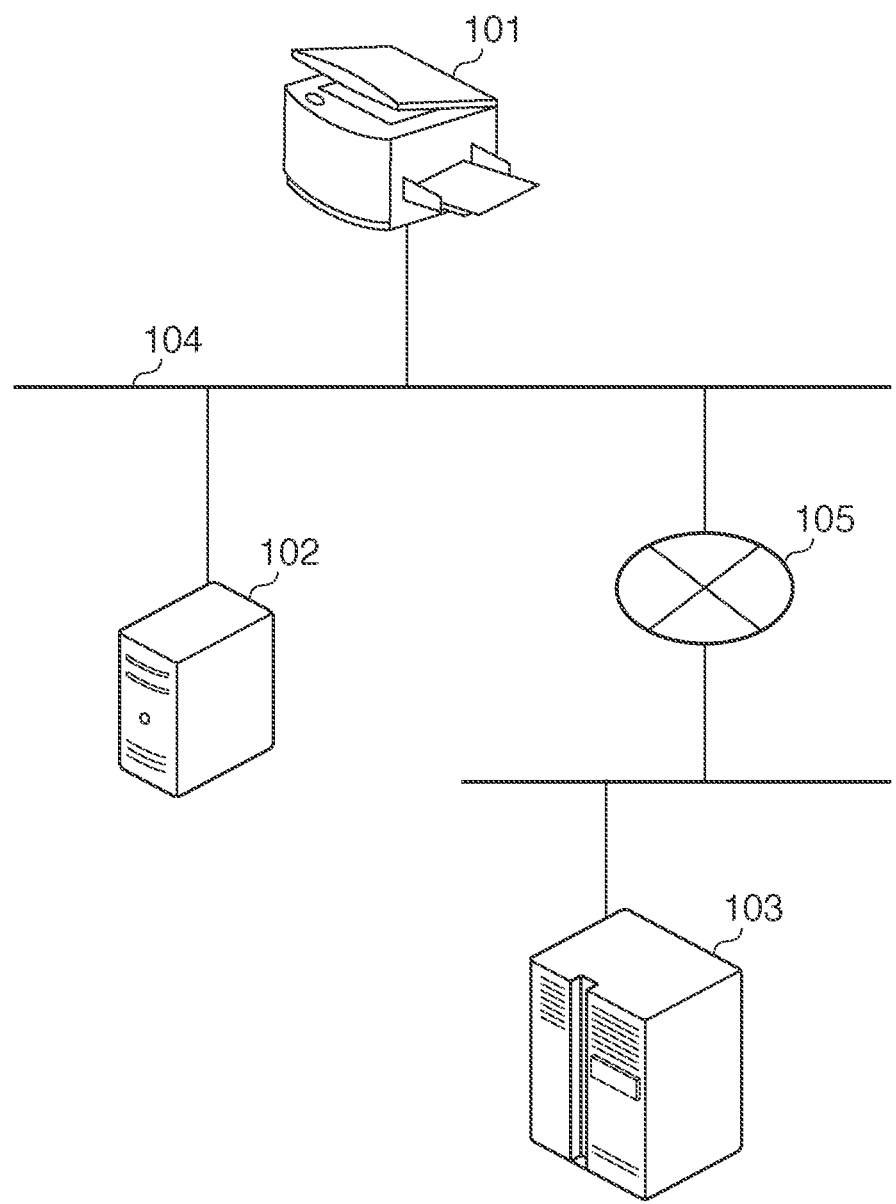
FIG. 1 is a view showing the overall configuration of an information processing system according to an embodiment of the present invention.

In the first embodiment, an example will be described in which a web browser interprets the display language of content acquired from a web server, and based on it, switches the display language of an MFP main body. FIG. 1 is a view showing the overall configuration of an information processing system including an information processing apparatus according to the first embodiment.

In this system, an MFP 101 and web servers 102 and 103 are connected via a network formed from a local area network (to be referred to as a "LAN" hereinafter) 104 and Internet 105. The MFP 101 has a copy function of scanning a paper medium and forming and printing an image on a paper sheet based on the scan data. A web browser is installed in the MFP 101 so that it can acquire content stored in the web server 102 or 103 and display it on an operation display unit 211 (FIG. 2).

Figure 2:
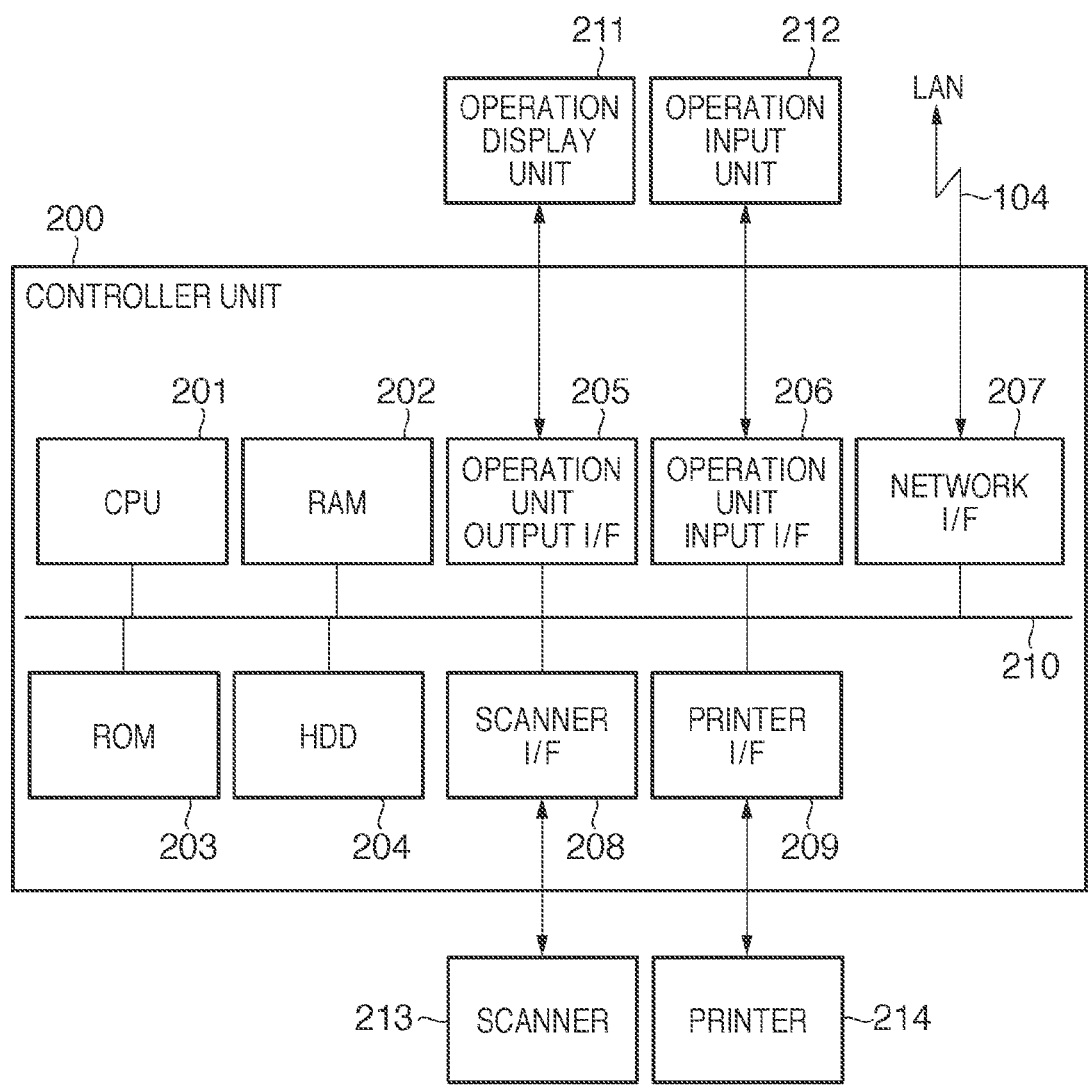
FIG. 2 is a block diagram showing the arrangement of an MFP 101.

FIG. 2 is a block diagram showing the arrangement of the MFP 101. The MFP includes a controller unit 200 which is connected to a scanner 213 and a printer 214 and is connectable to the operation display unit 211, an operation input unit 212, and the LAN 104.

The controller unit 200 includes a central processing unit (to be referred to as a "CPU" hereinafter) 201 that executes various control programs. The CPU 201 activates the MFP 101 based on a boot program stored in a read only memory (to be referred to as a "ROM" hereinafter) 203. The CPU 201 also reads out control programs stored in a hard disk drive (to be referred to as an "HDD" hereinafter) 204, and executes predetermined processing using a random access memory (to be referred to as a "RAM" hereinafter) 202 as a work area.

Figure 4:
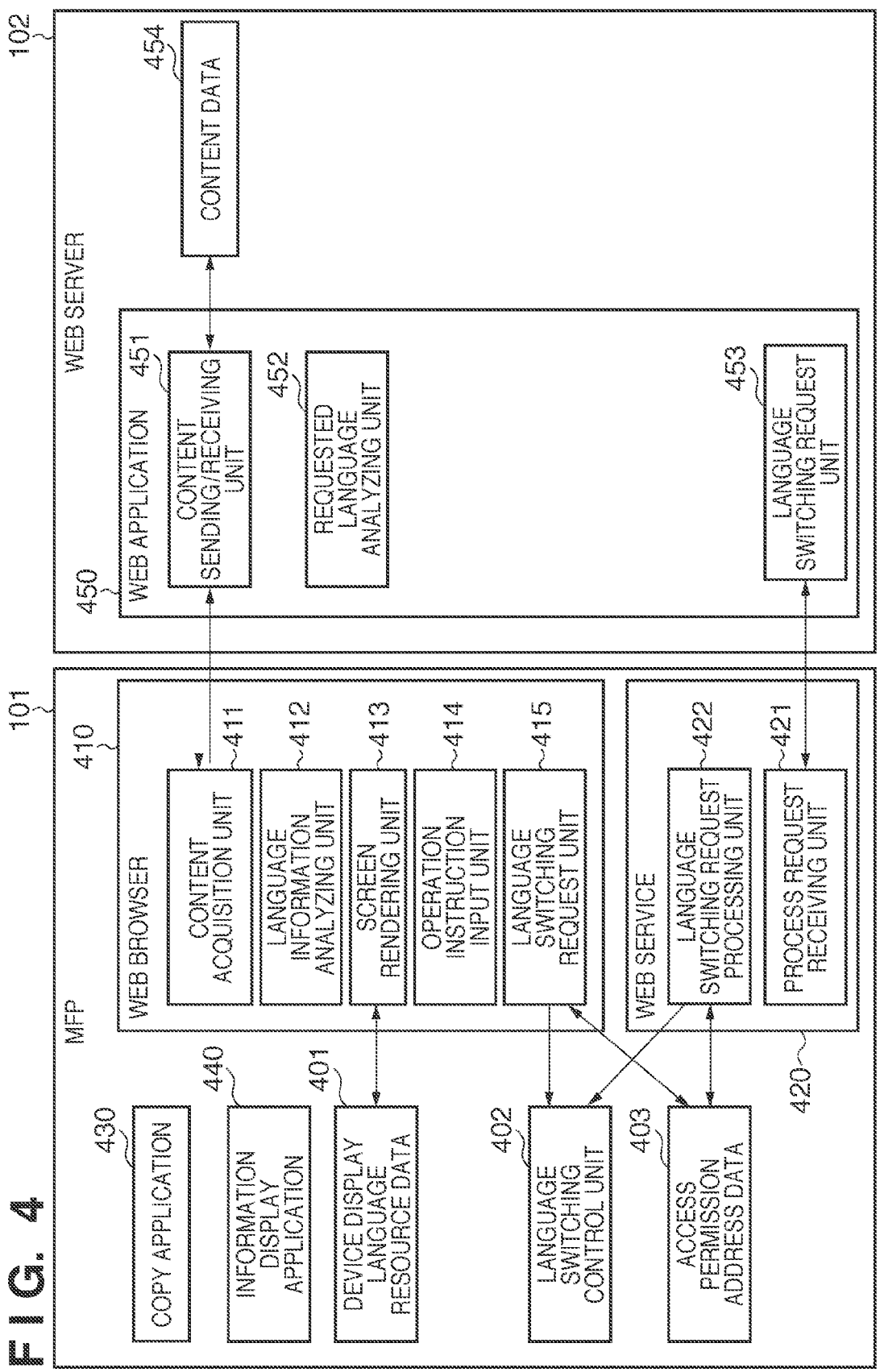
FIG. 4 is a block diagram showing the software configuration of the information processing system.

The HDD 204 stores various control programs including the functions of a web browser 410, web service 420, copy application 430, and the like shown in FIG. 4. The HDD 204 also stores font data of various languages and image data to be used to cause the web browser 410 to display content or display the screen of the MFP 101 main body. The HDD 204 also stores scan data read from the scanner 213 and content data acquired from the web servers outside the device via a network I/F 207.

An operation unit output I/F 205 controls data output communication to the operation display unit 211. An operation unit input I/F 206 controls data input communication from the operation input unit 212. The network I/F 207 is connected to the LAN 104 so as to control information input/output via the LAN 104.

A scanner I/F 208 receives image data from the scanner 213, and inputs/outputs scanner control data. A printer I/F 209 outputs output image data to the printer 214, and inputs/outputs printer control data. The operation input unit 212 is a user instruction input interface including input devices such as a touch panel and hard keys. The operation display unit 211 is a display interface for user including display devices such as a liquid crystal display (to be referred to as an "LCD" hereinafter) and light emitting diodes (to be referred to as "LEDs" hereinafter).

The scanner 213 includes an optical reading device such as a charge coupled device (to be referred to as a "CCD" hereinafter), and has a function of optically scanning a paper medium and reading it as electronic image data. The printer 214 has a function of forming electronic image data as an image on a printing medium such as a paper sheet. A system bus 210 connects the devices including the CPU 201 to the printer I/F 209 to each other.

Figure 3:
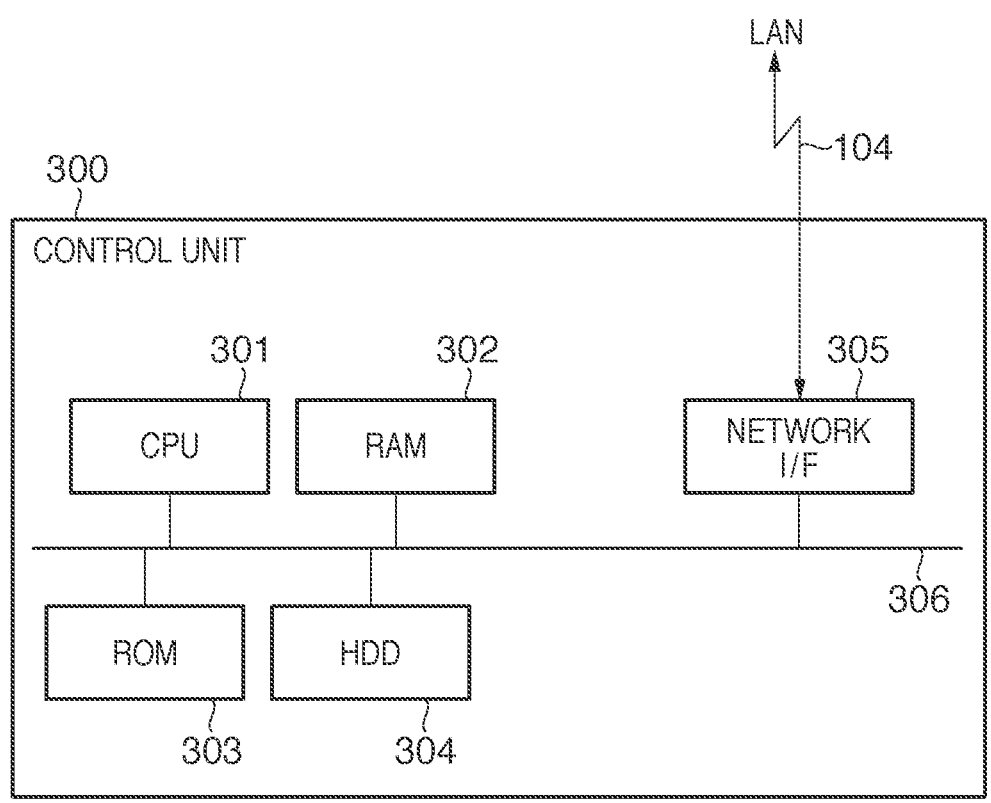
FIG. 3 is a block diagram showing the arrangement of a web server 102.

FIG. 3 is a block diagram showing the arrangement of the web server 102. Note that the web server 103 has the same arrangement as that of the web server 102. The web server 102 includes a control unit 300 connectable to the LAN 104. The control unit 300 includes a CPU 301 that executes various control programs, and controls the overall operation of the web server 102. The CPU 301 reads out control programs stored in a ROM 303 or an HDD 304, and executes predetermined processing using a RAM 302 as a work area.

The HDD 304 stores various control programs including the functions of a web application 450. The HDD 304 also stores content data 454 to be sent to the web browser 410 by the web application 450.

A network I/F 305 is connected to the LAN 104 so as to control information input/output via the LAN 104. A system bus 306 connects the devices 302 to 305 to the CPU 301.

FIG. 4 is a block diagram for explaining the software configuration of the entire information processing system including the MFP 101 and the web server 102. The applications and functional units shown in FIG. 4 are realized by causing the CPUs of the MFP 101 and web server 102 to read out and execute the control programs stored in the corresponding ROMs and HDDs. The MFP 101 includes functional applications such as the web browser 410, web service 420, copy application 430, information display application 440, and language switching control unit 402.

The web browser 410 includes a content acquisition unit 411, language information analyzing unit 412, screen rendering unit 413, operation instruction input unit 414, and language switching request unit 415. The content acquisition unit 411 communicates with the web server on the network via the network I/F 207. More specifically, the content acquisition unit 411 requests content from the web server upon receiving an instruction from the user, and receives the content sent from the web server based on the request.

The language information analyzing unit 412 analyzes the details of the content the content acquisition unit 411 has acquired from the web server, thereby identifying the display language of the content. The screen rendering unit 413 forms a content display screen based on the details of the content acquired by the content acquisition unit 411, and displays it on the operation display unit 211 via the operation unit output I/F 205.

The content acquired from the web server 102 is mainly composed of structured language files such as HTML and image data files, which describe the contents of the operation screen displayed on the operation display unit 211. Based on the details of the acquired content and language information identified by the language information analyzing unit 412, the screen rendering unit 413 acquires language data from device display language resource data 401, forms a display screen, and displays it on the operation display unit 211. The screen rendering unit 413 also renders a tool bar to be used to input an operation instruction to the web browser 410 and an address bar that displays the URL address of the web server 102 where the content has been acquired.

The device display language resource data 401 stores display language font data and the like to be used by the functions of the MFP 101 to display a screen on the operation display unit 211. The operation instruction input unit 414 receives an instruction input by the user via the operation unit input I/F 206. The operation instruction input unit 414 receives, for example, a URL address input setting instruction, an instruction to access a link included in the content display screen displayed on the operation display unit 211, a content request instruction by submitting a form, and the like.

The language switching request unit 415 instructs the language switching control unit 402 to switch the display language based on the language information identified by the language information analyzing unit 412. The web service 420 includes a process request receiving unit 421 and a language switching request processing unit 422. The process request receiving unit 421 receives various process requests from the web server, and analyzes their content.

If the content of the process request analyzed by the process request receiving unit 421 indicates an MFP language switching request, the language switching request processing unit 422 instructs the language switching control unit 402 to switch the display language. At this time, the language switching request processing unit 422 determines whether to instruct language switching by referring to access permission address data 403.

The access permission address data 403 stores address information of web servers from which an MFP language switching request is received. The language switching request processing unit 422 receives only language switching requests from web servers corresponding to the addresses stored in the access permission address data 403.

The copy application 430 realizes a copy function of causing the scanner 213 to scan an original, performing various kinds of image processing, and causing the printer 214 to print. The copy application 430 also displays various setting screens for the copy function on the operation display unit 211.

The information display application 440 displays, on the operation display unit 211, the statuses of devices and jobs in the MFP 101, the title of a functional application in current use, and the like. The language switching control unit 402 switches the display language displayed on the operation display unit 211. Display switching is realized by causing the language switching control unit 402 to change the reference destination of the device display language resource data 401 to be referred to by each functional application or instruct each functional application to switch the display language.

On the other hand, the web server 102 has the function of the web application 450. The web application 450 includes a content sending/receiving unit 451, requested language analyzing unit 452, and language switching request unit 453. The content sending/receiving unit 451 receives a content sending request from the content acquisition unit 411 of the web browser 410. The content sending/receiving unit 451 also sends the content data 454 to the content acquisition unit 411 based on the contents of the content sending request and an analysis result from the requested language analyzing unit 452.

The requested language analyzing unit 452 analyzes the content sending request received by the content sending/receiving unit 451, and analyzes the language information of the requested content. Based on the analysis result from the requested language analyzing unit 452, the language switching request unit 453 requests the process request receiving unit 421 of the web service 420 to switch the display language of the MFP.

Figure 5:
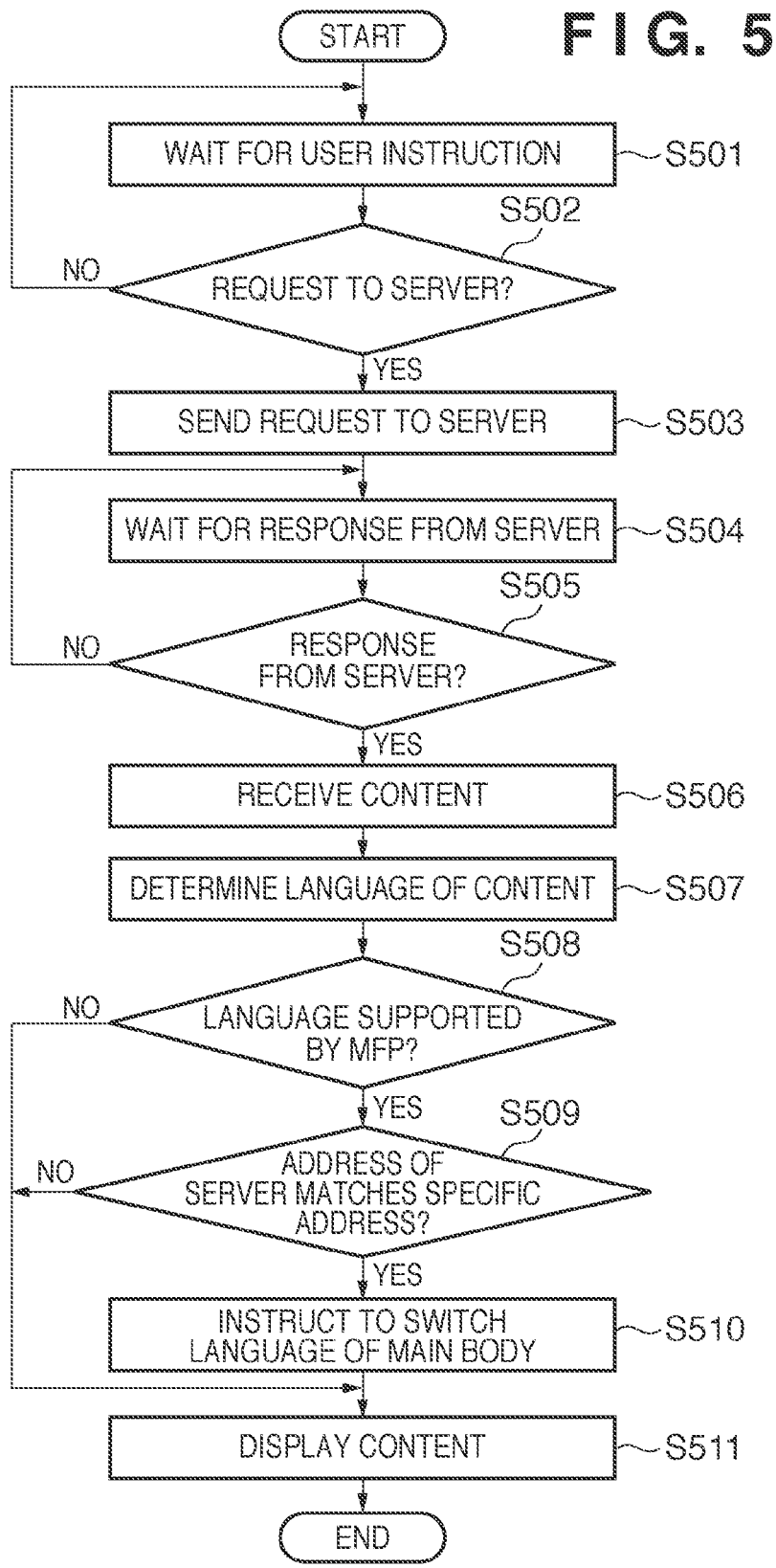
FIG. 5 is a flowchart for explaining the operation of a web browser 410 according to the first embodiment.

FIG. 5 is a flowchart for explaining a series of operations to be executed by the MFP 101 when the web browser 410 has received a user instruction and switched the display language of content. Each operation shown in the flowchart of FIG. 5 is realized by causing the CPU 201 of the MFP 101 to execute a control program stored in the ROM 203 or HDD 204.

In step S501, the web browser 410 receives an operation instruction from the user. At this time, the operation instruction input unit 414 receives various operation instructions for the web browser 410 from the user via the operation unit input I/F 206.

In step S502, the web browser 410 determines the operation instruction input from the user to the operation instruction input unit 414. The web browser 410 determines whether the operation instruction input from the user is a content acquisition request to the web server.

Figure 6A:
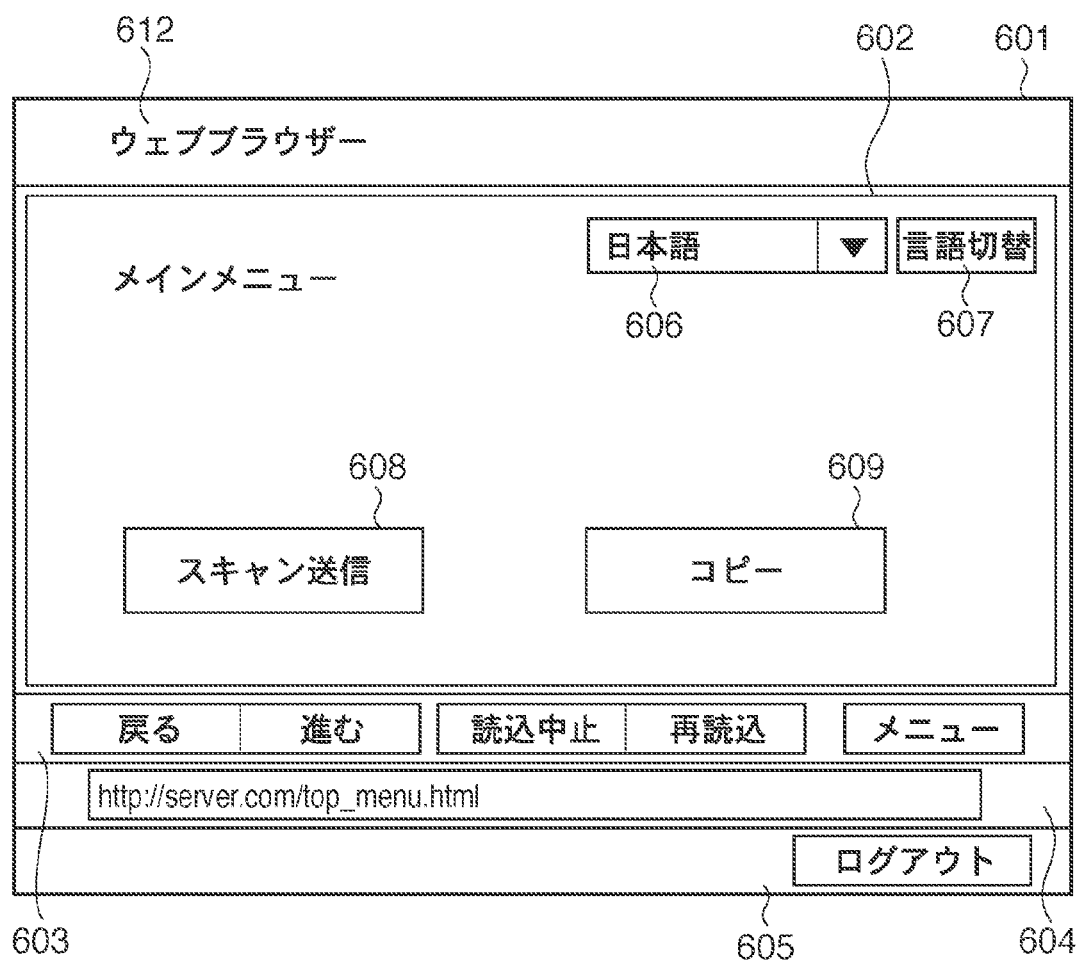
FIGS. 6A to 6E are views showing operation screens displayed on an operation display unit 211 of the MFP 101.
Figure 6B:
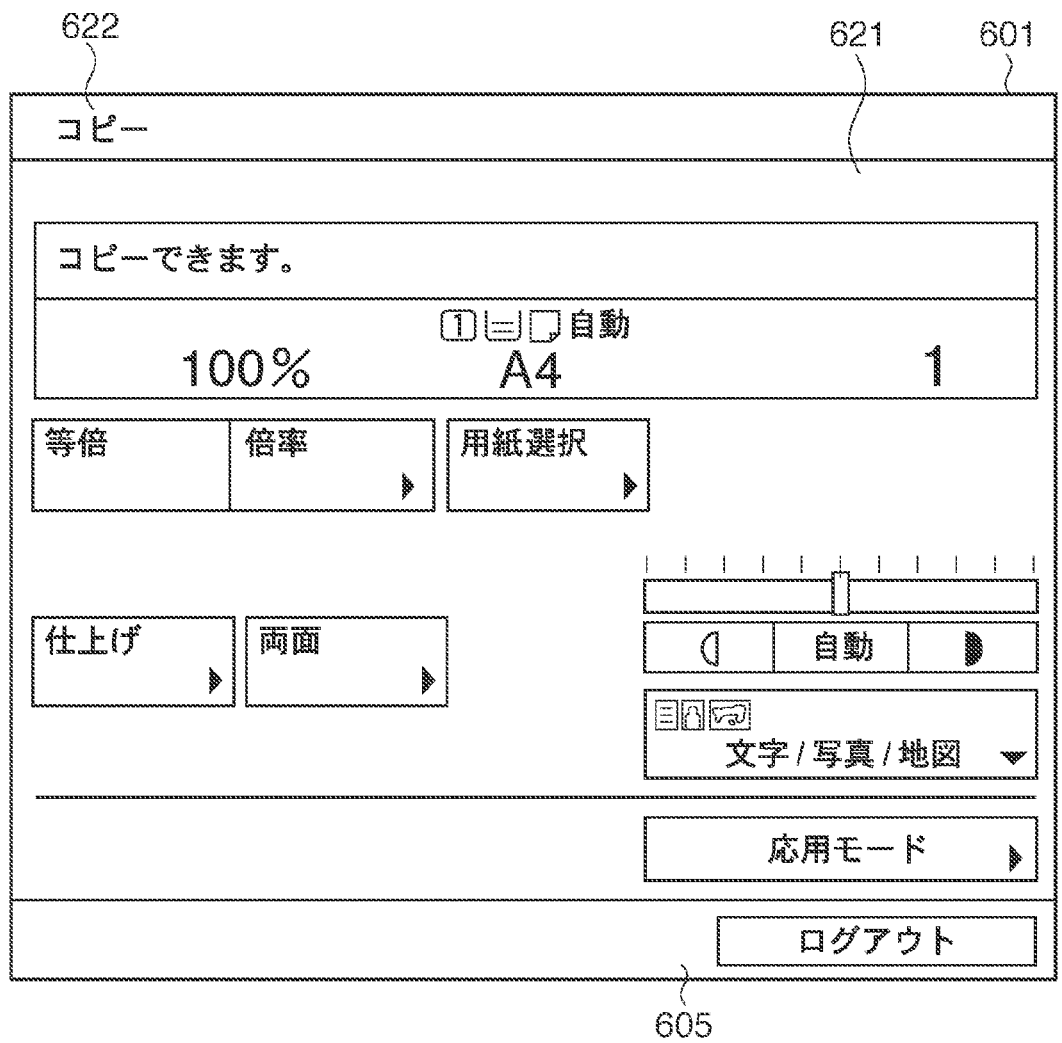
Figure 6C:
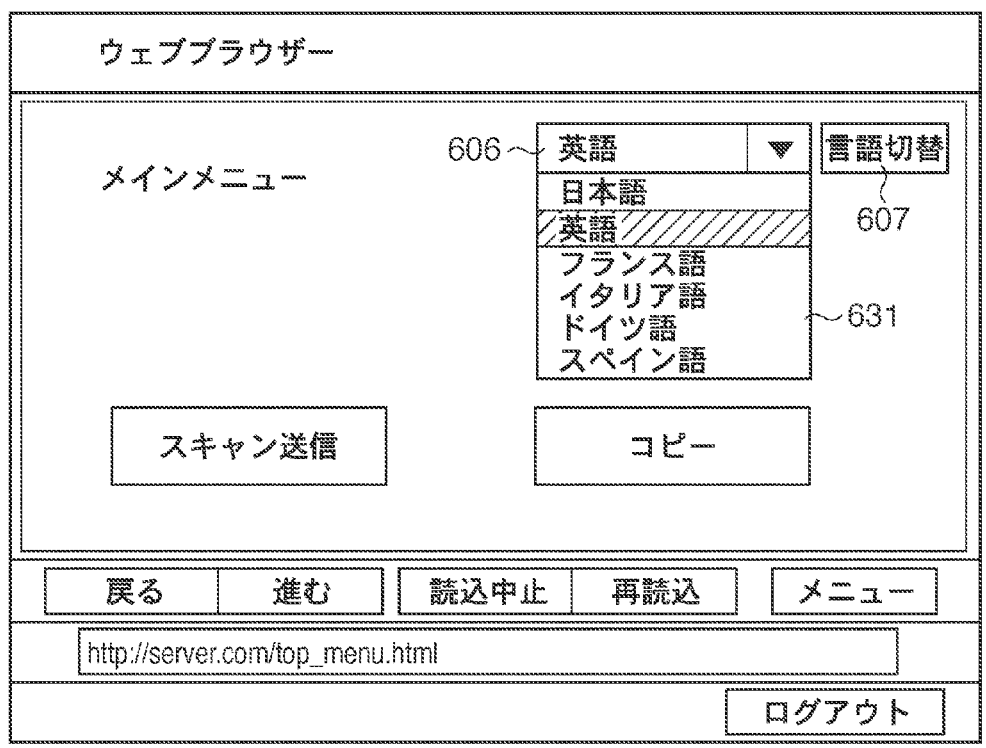
Figure 6D:
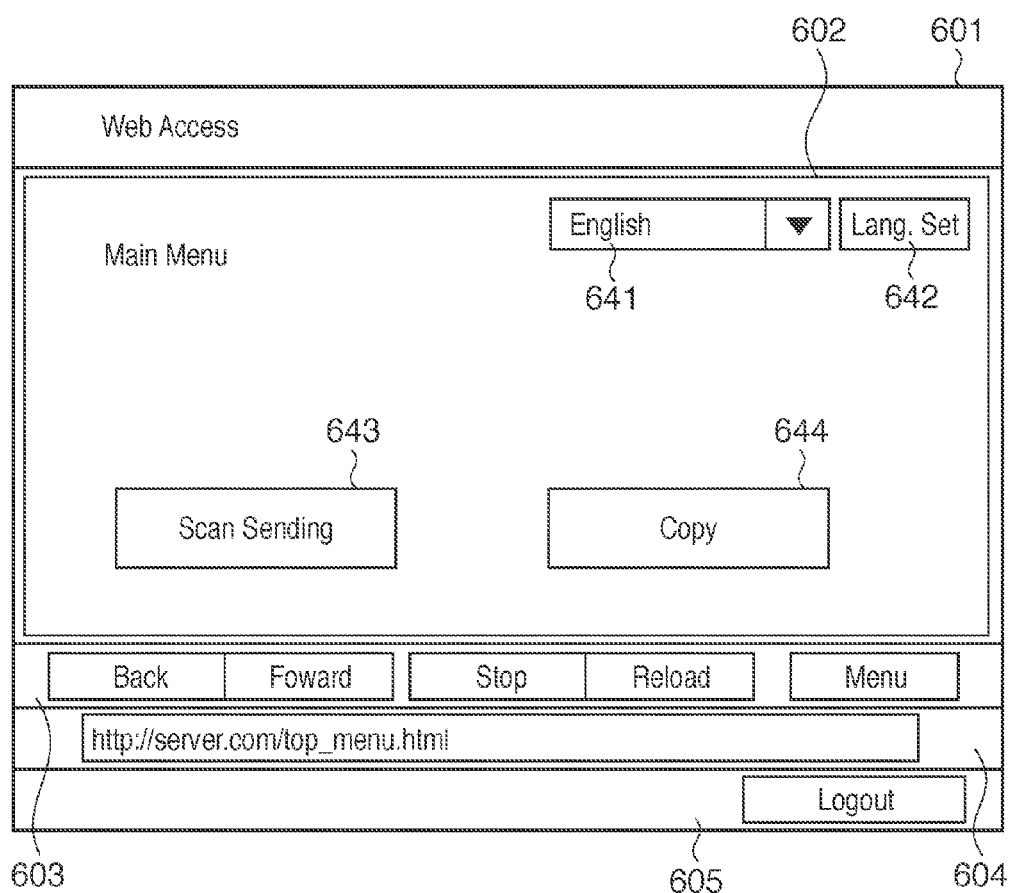
Figure 6E:
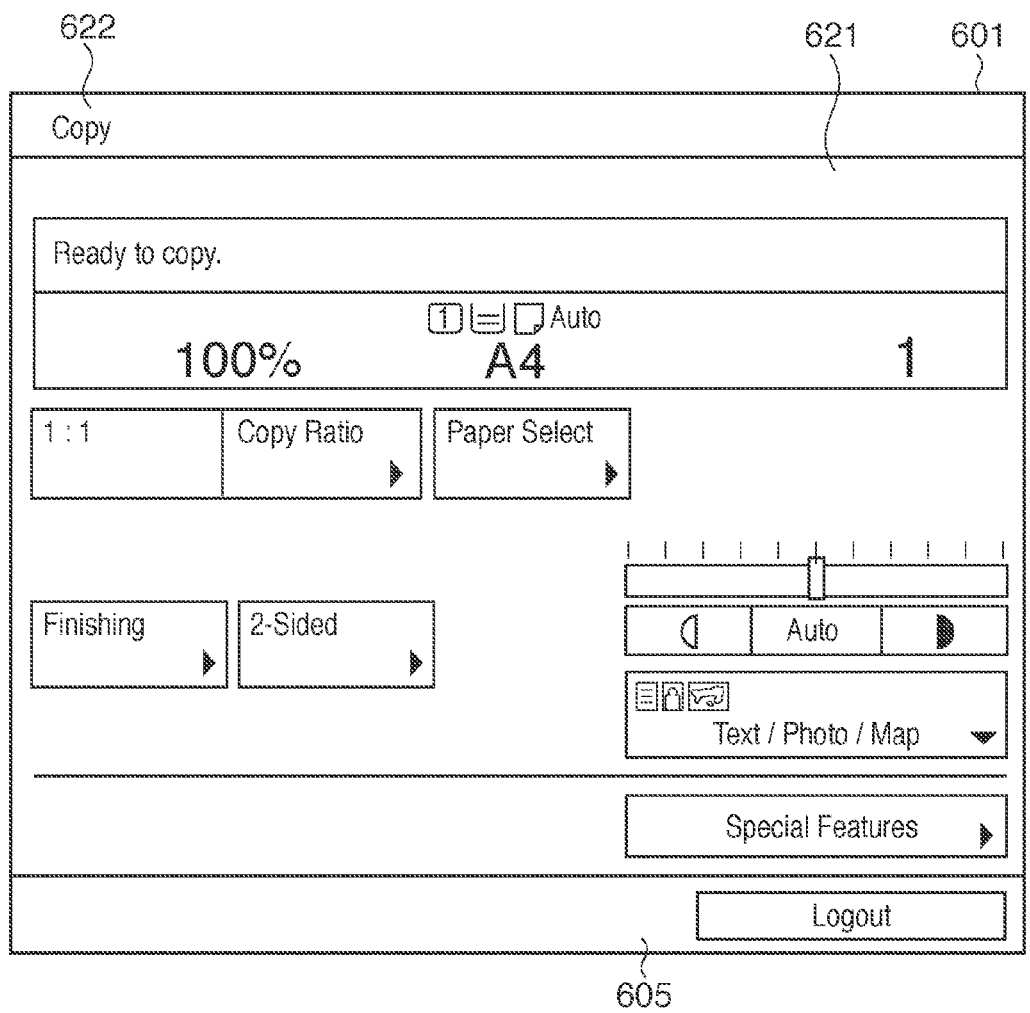

FIGS. 6A to 6E show examples of operation screens displayed on the operation display unit 211 of the MFP 101. These operation screens are displayed on the operation display unit 211 by the screen rendering unit 413 of the web browser 410, the copy application 430, and the information display application 440 via the operation unit output I/F 205. Note that FIGS. 6A to 6C illustrate operation screens displayed in Japanese, and FIGS. 6D and 6E illustrate operation screens displayed in English.

FIG. 6A shows an example of screen display when the web browser 410 displays content acquired from the web server. A title display region 601 displays a title 612 of the functional application currently displayed on the operation unit screen. The information display application 440 displays the title display region.

A content display region 602, tool bar 603, and address bar 604 are displayed by the screen rendering unit 413 of the web browser 410.

The content acquired from the web server 102 is rendered in the content display region 602. The tool bar 603 displays buttons to be used by the user to input operation instructions to the web browser 410. The address bar 604 displays the address of the web server from which the content currently displayed in the content display region 602 is acquired.

A status display portion 605 displays the status of a job being executed in the MFP 101 or a device of the MFP 101. The information display application 440 displays the status display portion 605. In this example, the content displayed in the content display region 602 includes a link 608 to the functional screen provided by the web application and a link 609 to the screen of the copy application 430 provided by the MFP 101. In addition, a language selection pull-down 606 to be used to select the display language of the content and a language switching instruction button 607 to be used to instruct switching to the selected display language are arranged in the upper right corner.

FIG. 6B shows a screen displayed by pressing the link 609 to switch to the copy application in FIG. 6A. A copy screen display region 621 displays buttons to be used to do various settings of the copy function. The copy application 430 displays the copy screen display region 621. In FIG. 6B as well, the information display application 440 displays the title display region 601 and the status display portion 605. A title 622 changes to one indicating the copy application.

FIG. 6C shows a screen displayed upon selecting the language selection pull-down 606 in FIG. 6A. A language selection list 631 is displayed in the language selection pull-down 606. The user selects a desired display language, and presses the language switching instruction button 607. According to this operation, the web browser 410 sends, to the web server, a request to acquire the content of the current address and the language information selected by the user.

In step S502 of FIG. 5, it is determined whether the instruction is an instruction to press the language switching instruction button 607 or an instruction to press the link 608 to the functional screen provided by the web application. That is, the web browser determines whether the instruction is a content acquisition instruction to the web server.

If it is determined in step S502 that the instruction is not a content acquisition request to the server, the process returns to step S501. Upon determining in step S502 that the instruction is a content acquisition request to the server, the web browser requests the web server to acquire the designated content in step S503. This includes the case of pressing the language switching instruction button 607 in FIG. 6A or 6C. At this time, the language information of the content to be acquired is added to the request. That is, the web browser notifies the web server 102 of the language information selected by the user from the language selection list 631 in FIG. 6C together with the content acquisition request.

After that, in step S504, the web browser 410 waits for a response from the web server 102. In step S505, the web browser 410 determines whether a response from the web server 102 exists. If no response exists, the process returns to step S504 to wait for a response.

When a response from the web server 102 exists in step S505, the content acquisition unit 411 receives the content sent from the web server 102 in step S506. In step S507, the language information analyzing unit 412 analyzes the language information of the acquired content.

In step S508, the web browser 410 determines whether the language of the content analyzed by the language information analyzing unit 412 is a display language currently supported by the MFP 101. Upon determining that the language is not supported by the MFP 101, the process in step S511 is performed.

Upon determining in step S508 that the language coincides with a display language supported by the MFP 101, the process in step S509 is performed. In step S509, the language switching request unit 415 determines whether the address of the web server 102 from which the content is acquired matches the access permission address data 403. If it is determined that the addresses do not match, the process in step S511 is performed.

If it is determined in step S509 that the addresses match, the language switching request unit 415 requests the language switching control unit 402 in step S510 to switch the display language to the language determined in step S507. The language switching control unit 402 thus switches the language of each functional application of the MFP 101 to the display language designated by the user. After that, in step S511, the screen rendering unit 413 displays the acquired content on the operation display unit 211.

FIG. 6D shows an operation screen displayed on the operation display unit 211 in step S511 after the language switching request in step S502. Referring to FIG. 6D, display in the content display region 602 is done by the web browser 410 in accordance with the display language of the content acquired from the web server 102.

The language switching control unit 402 instructs each functional application of the MFP 101 to switch the language. Hence, the display language of the title display region 601 and the status display portion 605 displayed by the information display application 440 and the tool bar 603 displayed by the web browser 410 also changes in accordance with the display language of the content.

FIG. 6E shows a screen displayed by pressing a link 644 to the copy application in FIG. 6D. In this example, the display language of the copy screen display region 621 also changes to English in accordance with the display language of the content displayed by the web browser 410 in FIG. 6D.

Figure 7:
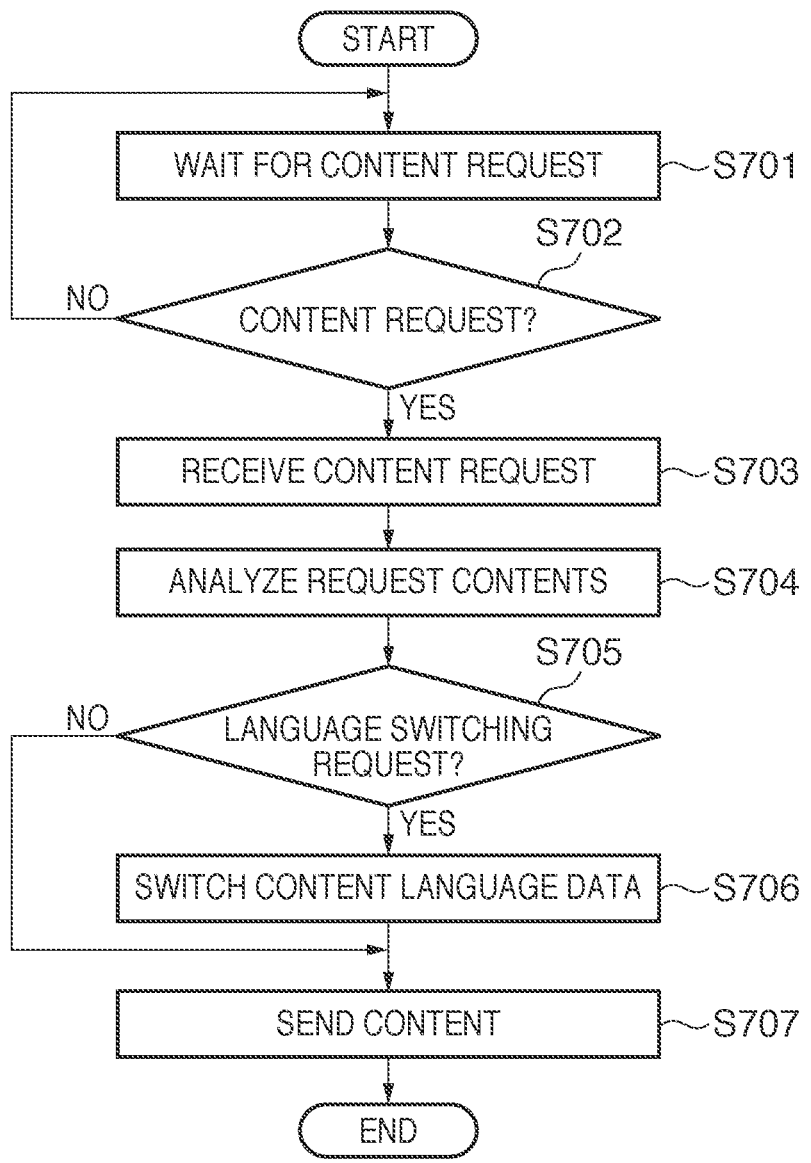
FIG. 7 is a flowchart for explaining the operation of a web application 450 according to the first embodiment.

FIG. 7 is a flowchart for explaining a series of operations to be executed by the web application 450 running on the web server 102 according to the first embodiment. Each operation shown in the flowchart of FIG. 7 is realized by causing the CPU 301 of the web server to execute a control program stored in the ROM 303 or HDD 304.

In step S701, the web application 450 receives a content acquisition request from the web browser 410. At this time, the content sending/receiving unit 451 waits for a content acquisition request from the content acquisition unit 411 of the web browser 410.

In step S702, the content sending/receiving unit 451 determines whether a content acquisition request from the content acquisition unit 411 exists. Upon determining in step S702 that no content acquisition request exists, the process returns to step S701. If it is determined in step S702 that a content acquisition request exists, the content sending/receiving unit 451 receives the content acquisition request in step S703.

In step S704, the requested language analyzing unit 452 analyzes the details of the content acquisition request and the requested language received in step S703. In step S705, the web application 450 determines whether the analysis result in step S704 indicates a content language switching request. Upon determining that it is not a language switching request, the process in step S707 is performed.

If it is determined in step S705 that it is a language switching request, the web application 450 switches the content language data in step S706. The web application 450 instructs the content sending/receiving unit 451 to send the content data 454 in the designated language. The web application 450 also rewrites the content data 454 to the designated language as needed.

In step S707, the content sending/receiving unit 451 sends, to the content acquisition unit 411, the content data requested by the web browser 410.

When the display language of the web content is switched by the series of operations shown in FIGS. 5 and 7, the display language of each functional application of the MFP 101 also changes. Since the user need not switch the display language of the device in accordance with the content displayed on the web browser 410, convenience of operation display improves.

Additionally, the display language of each functional application of the MFP 101 is designated by the web browser 410. For this reason, the web application 450 need only send content in the display language requested by the web browser without concern for display language switching in the MFP 101. This enables flexible and easy content creation because display language control in the MFP 101 need not be taken into consideration.

Second Embodiment

The second embodiment of the present invention will be described next. In the second embodiment, an example will be described in which a web server executes a language switching instruction for the web service of an MFP, thereby switching the display language of the MFP main body to the same display language as that of content sent to the web browser. Note that the system configuration and the like are the same as in the first embodiment, and only parts different from the first embodiment will be explained here.

Figure 8:
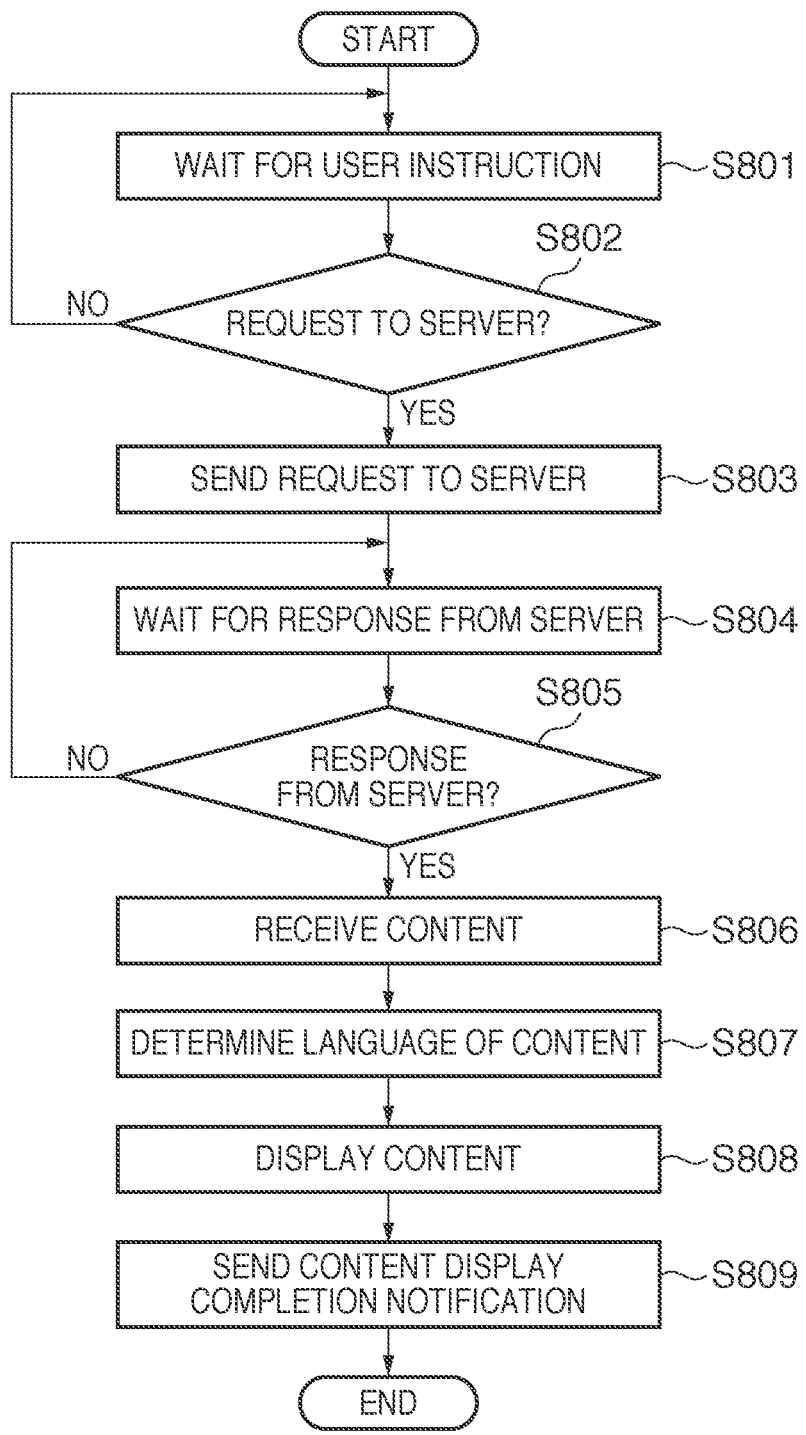
FIG. 8 is a flowchart for explaining the operation of a web browser 410 according to the second embodiment.

FIG. 8 is a flowchart for explaining a series of operations to be executed by a web browser 410 when it has received a user instruction and switched the display language of content in the second embodiment. Each operation shown in the flowchart of FIG. 8 is realized by causing a CPU 201 of an MFP 101 to execute a control program stored in a ROM 203 or HDD 204.

The processing in steps S801 to S807 is the same as that in steps S501 to S507 of the flowchart shown in FIG. 5, and a description thereof will not be repeated.

In step S808, a screen rendering unit 413 displays the acquired content on an operation display unit 211. In step S809, the screen rendering unit 413 notifies a web service 420 of the end of content display.

Figure 9:
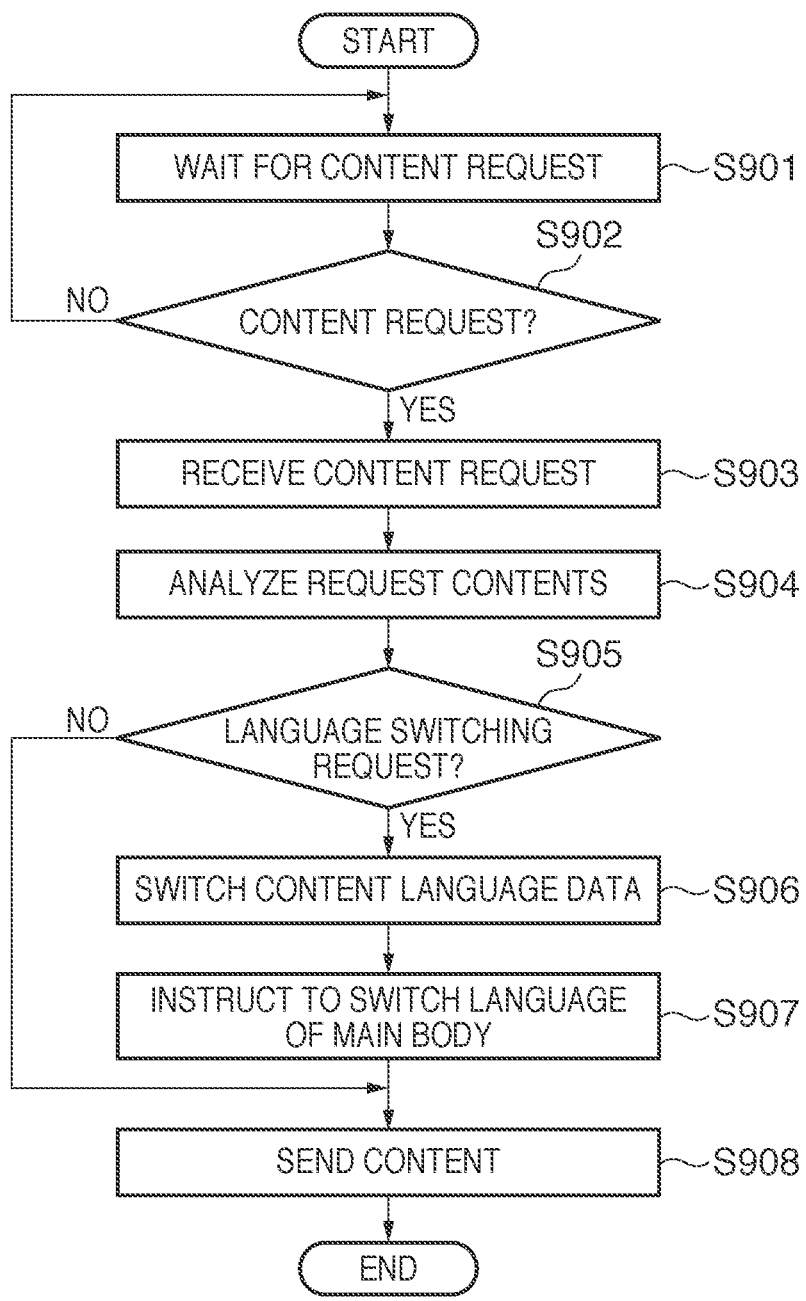
FIG. 9 is a flowchart for explaining the operation of a web application 450 according to the second embodiment.

FIG. 9 is a flowchart for explaining a series of operations to be executed by a web application 450 on a web server 102 according to the second embodiment. Each operation shown in the flowchart of FIG. 9 is realized by causing a CPU 301 of the web server 102 to execute a control program stored in a ROM 303 or HDD 304.

The processing in steps S901 to S906 is the same as that in steps S701 to S706 of the flowchart show in FIG. 7, and a description thereof will not be repeated.

In step S907, a language switching request unit 453 instructs a process request receiving unit 421 of the web service 420 to switch the display language of the MFP 101 in accordance with the language analyzed in step S904. After that, in step S908, a content sending/receiving unit 451 sends, to a content acquisition unit 411, the content data requested by the web browser 410.

Figure 10:
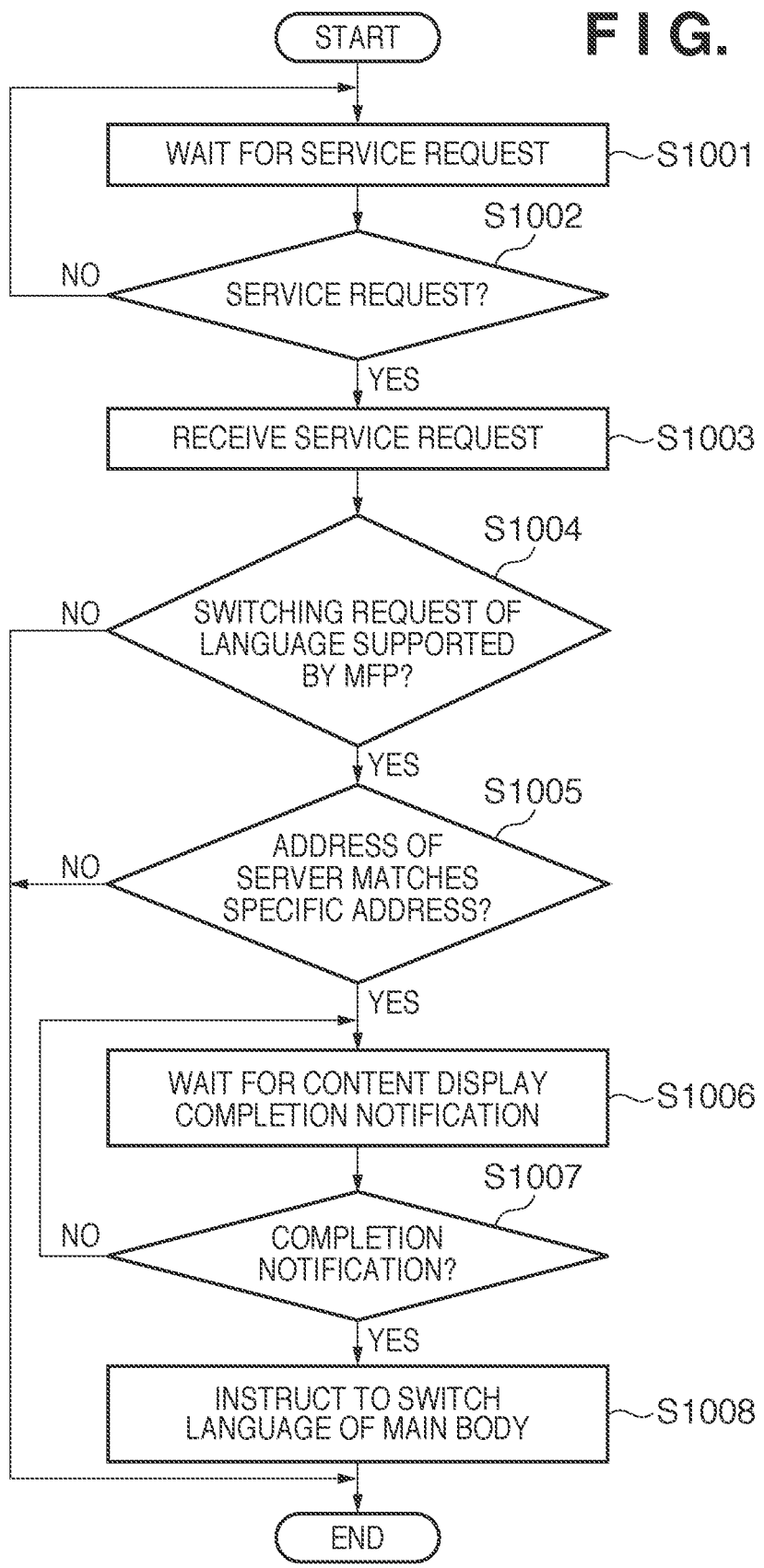
FIG. 10 is a flowchart for explaining the operation of a web service 420 according to the second embodiment.

FIG. 10 is a flowchart for explaining a series of operations to be executed by the web service 420 in the MFP 101 according to the second embodiment. Each operation shown in the flowchart of FIG. 10 is achieved by causing the CPU 201 of the MFP 101 to execute a control program stored in the ROM 203 or HDD 204.

In step S1001, the web service 420 receives, from the web application 450, a request to switch the display language of the MFP 101. At this time, the process request receiving unit 421 waits for a display language switching request from the language switching request unit 453 of the web application 450.

In step S1002, the process request receiving unit 421 determines whether a display language switching request from the language switching request unit 453 exists. If it is determined in step S1002 that no display language switching request exists, the process returns to step S1001. Upon determining in step S1002 that a display language switching request exists, the process request receiving unit 421 receives the display language switching request in step S1003.

In step S1004, the web service 420 determines whether the language of the display language switching request received by the process request receiving unit 421 is a display language currently supported by the MFP 101. Upon determining that the language is not supported by the MFP 101, the series of processes ends.

Upon determining in step S1004 that the language coincides with a display language supported by the MFP 101, the process in step S1005 is performed. In step S1005, a language switching request processing unit 422 determines whether the address of the web server that has instructed language switching matches access permission address data 403. If it is determined that the addresses do not match, the series of processes ends.

If it is determined in step S1005 that the addresses match, the web service 420 waits for a notification of content rendering process completion from the web browser 410 in step S1006.

In step S1007, the web service 420 determines whether a rendering completion notification is received from a screen rendering unit 413 of the web browser 410. Upon determining in step S1007 that no rendering completion notification is received, the process returns to step S1006. Upon determining that a rendering completion notification is received from the screen rendering unit 413, the language switching request processing unit 422 requests a language switching control unit 402 to switch the display to the language of the switching instruction target in step S1003 in step S1008. The language switching control unit 402 thus switches the language of each functional application of the MFP 101 to the designated language.

The web service waits for the content rendering completion notification from the web browser 410 in step S1007 because it is necessary to synchronize content rendering of the web browser 410 with language switching of each functional application of the MFP main body. In general, content rendering of the web browser is slower than rendering of each functional application of the MFP. When displaying content on the web browser, each functional application of the MFP switches the language first, thereby preventing a sense of incongruity on the part of the user.

With the series of processes, the display language of the MFP device also changes in accordance with display language switching of web content, as in the first embodiment. Since the user need not switch the display language of the device in accordance with the web content, convenience of operation display improves.

In the second embodiment, the MFP which should switch the display language of the device need not be the same as the MFP which has sent the language switching instruction to the web application 450 of the web server 102. That is, the web application 450 can send a language switching instruction to an MFP other than the MFP from which the content language switching request has been received. This allows switching of the display language of a plurality of MFPs at once.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-279816, filed Dec. 9, 2009 which is hereby incorporated by reference herein in its entirety.

What is claimed is:

1. An information processing apparatus comprising:
a display unit configured to display a first screen that displays content acquired from an external server and a second screen that displays content stored in the information processing apparatus;
an accepting unit configured to accept, from a user via the first screen, a selection of a language to be used to display the first screen;
a requesting unit configured to request, from the external server, content corresponding to the selected language;
a first determination unit configured to determine whether the external server, of which the requesting unit makes the request, is a specific external server; and
a setting unit configured to, when said first determination unit determines that the external server, of which the requesting unit makes the request, is the specific external server, set a language to be used to display the second screen to the same language as the selected language.

2. The apparatus according to claim 1, further comprising a second determination unit configured to determine whether the information processing apparatus supports the selected language,
wherein said setting unit performs the setting when said second determination unit determines that the information processing apparatus supports the selected language.

3. The apparatus according to claim 1, wherein said display unit has a web browser function, and an operation key to be used to perform an operation concerning the first screen is displayed on the second screen.

4. The apparatus according to claim 1, wherein the first screen is an operation screen to be used to operate an application provided in the external server, and the second screen is an operation screen to be used to operate an application provided in the information processing apparatus.

5. The apparatus according to claim 4, wherein the content stored in the information processing apparatus is an application for a copy function.

6. A method of controlling an information processing apparatus including a display unit configured to display a first screen that displays content acquired from an external server and a second screen that displays content stored in the information processing apparatus, the method comprising:
accepting, from a user via the first screen, a selection of a language to be used to display the first screen;
requesting, from the external server, content corresponding to the selected language;
determining whether the external server, of which the request if made, is a specific external server; and
when it is determined in the determining that the external server, of which the request is made, the specific external server, setting a language to be used to display the second screen to the same language as the selected language.

7. A non-transitory computer-readable storage medium storing computer-executable code of a computer program which, when executed by a computer, causes the computer which includes a display unit configured to display a first screen that displays content acquired from an external server and a second screen that displays content stored in the computer, to execute:
accepting, from a user via the first screen, a selection of a language to be used to display the first screen;
requesting, from the external server, content corresponding to the selected language;
determining whether the external server, of which the request if made, is a specific external server; and
when it is determined in the determining that the external server, of which the request is made, the specific external server, setting a language to be used to display the second screen to the same language as the selected language.

* * * * *